(12) United States Patent
Mao

(10) Patent No.: US 12,464,411 B2
(45) Date of Patent: Nov. 4, 2025

(54) VOICE CALL METHOD AND APPARATUS AND ELECTRONIC DEVICE

(71) Applicant: VIVO MOBILE COMMUNICATION CO., LTD., Dongguan (CN)

(72) Inventor: Yuanze Mao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 479 days.

(21) Appl. No.: 18/065,189

(22) Filed: Dec. 13, 2022

(65) Prior Publication Data

US 2023/0115955 A1 Apr. 13, 2023

Related U.S. Application Data

(63) Continuation of application No. PCT/CN2021/099652, filed on Jun. 11, 2021.

(30) Foreign Application Priority Data

Jun. 15, 2020 (CN) .......................... 202010542447.7

(51) Int. Cl.
*H04W 28/20* (2009.01)

(52) U.S. Cl.
CPC .................. *H04W 28/20* (2013.01)

(58) Field of Classification Search
CPC ........... H04W 28/20; H04W 36/00222; H04W 36/1446; H04W 84/12; H04W 88/06; H04W 48/18; H04M 7/0081
See application file for complete search history.

(56) References Cited

U.S. PATENT DOCUMENTS 6,081,536 A * 6/2000 Gorsuch ............ H04Q 11/0428
370/335
6,690,678 B1 * 2/2004 Basso ................. H04L 12/5602
370/468

(Continued)

FOREIGN PATENT DOCUMENTS

CN 102149144 A 8/2011
CN 105163355 A 12/2015

(Continued)

OTHER PUBLICATIONS

European Patent Office, Supplementary European Search Report issued in corresponding Application No. EP 21826813 mailed Nov. 3, 2023.

(Continued)

*Primary Examiner* — Mazda Sabouri
(74) *Attorney, Agent, or Firm* — Stites & Harbison, PLLC; Jeffrey A. Haeberlin

(57) ABSTRACT

This application discloses a voice call method and apparatus and an electronic device, and belongs to the field of communication technologies. The voice call method includes: determining the current network environment level information of the first network of the current voice call according to the current network parameter information of the first network; and allocating the bandwidth to the current voice call according to the current network environment level information; where the current network parameter information includes current network speed information, the bandwidth is a bandwidth of the first network or a bandwidth of a second network, and the first network is different from the second network.

15 Claims, 4 Drawing Sheets

(56) References Cited

U.S. PATENT DOCUMENTS

| | | | |
|---|---|---|---|
| 2006/0159116 A1* | 7/2006 | Gerszberg | H04L 47/6215 370/431 |
| 2015/0282013 A1 | 10/2015 | Kim et al. | |
| 2017/0142709 A1* | 5/2017 | Lake | H04W 72/0446 |
| 2019/0208445 A1* | 7/2019 | Klatsky | H04L 65/1069 |
| 2020/0128449 A1 | 4/2020 | Faus Gregori et al. | |

FOREIGN PATENT DOCUMENTS

| | | |
|---|---|---|
| CN | 106413007 A | 2/2017 |
| CN | 107371221 A | 11/2017 |
| CN | 108347579 A | 7/2018 |
| CN | 108366402 A | 8/2018 |
| CN | 108476450 A | 8/2018 |
| CN | 109511141 A | 3/2019 |
| CN | 109769273 A | 5/2019 |
| CN | 110933724 A | 3/2020 |
| CN | 111263017 A | 6/2020 |
| GB | 2563655 A | 12/2018 |
| IN | 201841012912 A | 10/2019 |
| JP | 2004-320458 A | 11/2004 |
| JP | 2011-504315 A | 2/2011 |
| WO | 2017/167694 A1 | 10/2017 |

OTHER PUBLICATIONS

Japan Patent Office, Office Action issued in corresponding Application No. JP 2022-574625, dated Feb. 6, 2024. (Translation not available.).

China National Intellectual Property Administration, International Search Report issued in corresponding Application No. PCT/CN2021/099652, mailed Sep. 1, 2021.

Korean Intellectual Property Office, Office Action issued in corresponding Application No. 10-2022-7041661 dated Mar. 27, 2025 (English translation not available).

Intellectual Property India, Office Action issued in corresponding Application No. IN 202317000153 mailed Nov. 1, 2023.

* cited by examiner

VOICE CALL METHOD AND APPARATUS AND ELECTRONIC DEVICE

CROSS-REFERENCE TO RELATED APPLICATIONS

This application is a continuation of International Application No. PCT/CN2021/099652, filed on Jun. 11, 2021, which claims priority to Chinese Patent Application No. 202010542447.7 filed in China on Jun. 15, 2020, which are incorporated herein by reference in their entireties.

TECHNICAL FIELD

This application belongs to the field of communication technologies, and particularly relates to a voice call method and apparatus and an electronic device.

BACKGROUND

With the rapid development of mobile Internet, wireless fidelity (Wi-Fi) has been used by international operators to provide in-depth supplementary coverage for cellular networks. Operators provide voice over Wi-Fi (VoWiFi, wireless voice) services for users through Wi-Fi hotspots. This has attracted much attention in the industry. With the VoWiFi technology, users can make and receive a voice call or a video call through Wi-Fi access while using mobile Internet.

When implementing this application, the inventor finds that there are at least the following problems in the prior art:

If a user makes a VoWiFi call while watching a video, due to a Wi-Fi network speed problem or a network resource allocation problem, a network resource bandwidth obtained for the VoWiFi call is low, resulting in interruption of the VoWiFi call and hanging up or switching the call to a network of another standard. This directly affects the nomination test and the normal usage of the VoWiFi call by the user, thus affecting user experience.

It can be seen from the above that the existing VoWiFi call solution has the problem of unstable call quality.

SUMMARY

According to a first aspect of this application, a voice call method is provided, which includes:
 determining current network environment level information of a first network of a current voice call according to current network parameter information of the first network; and
 allocating a bandwidth to the current voice call according to the current network environment level information;
 where the current network parameter information includes current network speed information; and
 the bandwidth is a bandwidth of the first network or a bandwidth of a second network, and the first network is different from the second network.

According to a second aspect of this application, a voice call apparatus is provided, which includes:
 a first determining module configured to determine current network environment level information of a first network of a current voice call according to current network parameter information of the first network; and
 a first allocation module configured to allocate a bandwidth to the current voice call according to the current network environment level information;
 where the current network parameter information includes current network speed information; and
 the bandwidth is a bandwidth of the first network or a bandwidth of a second network, and the first network is different from the second network.

According to a third aspect of this application, an electronic device is provided, which includes a processor, a memory, and programs or instructions stored in the memory and executable on the processor, where the programs or the instructions, when executed by the processor, implement the steps of the method according to the first aspect.

According to a fourth aspect of this application, a readable storage medium storing programs or instructions is provided, where the programs or the instructions, when executed by a processor, implement the steps of the method according to the first aspect.

According to a fifth aspect of this application, a chip is provided, which includes a processor and a communication interface, where the communication interface is coupled to the processor, and the processor is configured to run programs or instructions to implement the steps of the method provided according to the first aspect.

DETAILED DESCRIPTION

The technical solutions in the embodiments of this application are clearly described in the following with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

In the specification and claims of this application, the terms "first", "second" and the like are used to distinguish similar objects, but are not used to describe a specific order or sequence. It is to be understood that such used data is interchangeable in a proper circumstance, so that the embodiments of this application may be implemented in an order other than the order illustrated or described herein. The objects distinguished by "first" and "second" are usually of the same kind, and the number of objects is do not defined, for example, there may be one or more first objects. In addition, "and/or" in this specification and the claims represents at least one of the connected objects, and "/" generally indicates an "or" relationship between the associated objects.

A voice call method provided by the embodiments of this application are described in detail below with reference to the accompanying drawings by using specific embodiments and application scenarios.

Figure 1:
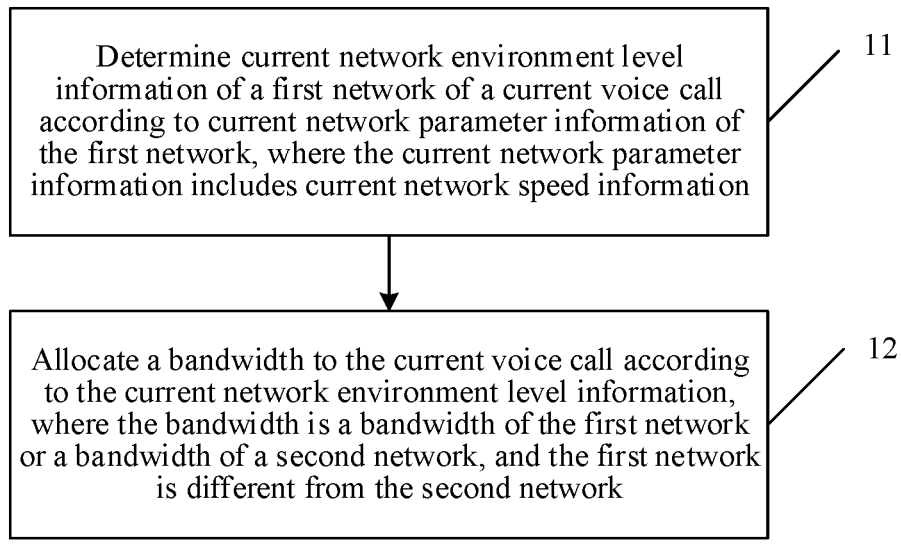
FIG. 1 is a schematic flowchart of a voice call method according to an embodiment of this application.

A voice call method provided by the embodiments of this application, as shown in FIG. 1, includes:

Step 11: Determine current network environment level information of a first network of a current voice call according to current network parameter information of the first network, where the current network parameter information includes current network speed information.

The current network speed information may be network speed level information of a current network speed, but is not limited thereto.

The current network environment level information may be preset representation information of a current network environment level. The representation information has a mapping relationship with the current network environment level, or may be the current network environment level, such as "high", "moderate", and "low".

The first network may be a current network of the current voice call or a network to be accessed, and is not limited thereto.

Step 12: Allocate a bandwidth to the current voice call according to the current network environment level information, where the bandwidth is a bandwidth of the first network or a bandwidth of a second network, and the first network is different from the second network.

Alternatively, the first network may be VoWiFi, and the second network may be voice over long-term evolution (VOLTE). The bandwidth allocated to the voice call may be adjusted in real time as the current network environment level changes, but is not limited thereto.

In the voice call method provided by the embodiments of this application, the current network environment level information of the first network of the current voice call is determined according to the current network parameter information of the first network; and the bandwidth is allocated to the current voice call according to the current network environment level information; where the current network parameter information includes current network speed information, the bandwidth is a bandwidth of the first network or a bandwidth of a second network, and the first network is different from the second network. Therefore, the voice call can be implemented based on network bandwidth allocation, so as to avoid that factors such as a network speed or network resource allocation reduce call quality in the voice call, ensure call quality and continuity, improve user experience, and desirably solve the problem of unstable call quality in the existing VoWiFi call solution.

Further, before the allocating a bandwidth to the current voice call according to the current network environment level information, the method further includes: determining a bandwidth lower limit required for the current voice call in the first network, and using the bandwidth lower limit as a bandwidth threshold.

This facilitates subsequent allocation of the bandwidth to the voice call. The required bandwidth lower limit may also be understood as a bandwidth for a normal call.

The determining a bandwidth lower limit required for the current voice call in the first network includes: determining, according to a packet loss rate of the current voice call, the bandwidth lower limit required for the current voice call in the first network.

In this way, the bandwidth lower limit may be determined more accurately and reasonably. Alternatively, it may be determined that a bandwidth corresponding to a packet loss rate less than or equal to a threshold is the bandwidth lower limit.

Alternatively, the allocating a bandwidth to the current voice call according to the current network environment level information includes: in a case that the current network environment level information indicates that the current network environment level is high, allocating the bandwidth of the first network to the current voice call according to the bandwidth threshold.

This can ensure the call quality of the voice call. That the current network environment level is high indicates that a current network environment status of the first network is desirable.

Further, after the allocating a bandwidth to the current voice call according to the current network environment level information, the method further includes: allocating, to a current concurrent service of the current voice call, a remaining bandwidth of the bandwidth of the first network other than the bandwidth allocated to the current voice call.

This can make full use of the network bandwidth resource and avoid the network bandwidth resource waste.

Alternatively, the allocating a bandwidth to the current voice call according to the current network environment level information includes: in a case that the current network environment level information indicates that the current network environment level is moderate, allocating the bandwidth of the first network to the current voice call and the current concurrent service of the current voice call according to a preset parameter, where the preset parameter includes: a priority order of the current voice call and the current concurrent service of the current voice call, or the preset parameter includes: the priority order and the bandwidth threshold.

In other words, when a network environment is ordinary and multiple services are concurrent, normal operation of a service preferentially selected by a user is ensured, so that user experience is improved. That the current network environment level is moderate indicates that the current network environment status of the first network is ordinary.

Bandwidth allocation according to the priority order is, for example, as follows: The order is service 1, service 2, service 3, and the like. In this case, according to the order, a bandwidth is first allocated to service 1, then a bandwidth is allocated to service 2, then a bandwidth is allocated to service 3, and the like.

Bandwidth allocation according to the priority order and the bandwidth threshold is, for example, as follows: The order is service 1 (a voice service), service 2, service 3, and the like. In this case, according to the order and the bandwidth threshold, a bandwidth is first allocated to service 1, then a bandwidth is allocated to service 2, then a bandwidth is allocated to service 3, and the like. This is only an example and constitutes no limitation.

Alternatively, the allocating a bandwidth to the current voice call according to the current network environment level information includes: in a case that the current network environment level information indicates that the current network environment level is low, allocating the bandwidth of the second network to the current voice call.

This can ensure call quality and continuity of the voice call and improve user experience. That the current network environment level is low indicates that the current network environment status of the first network is undesirable.

Further, after the allocating a bandwidth to the current voice call according to the current network environment level information, the method further includes: before switching the current voice call to the second network, allocating the bandwidth occupied in the first network to the current concurrent service of the current voice call.

This can make full use of the network bandwidth resource and avoid the network bandwidth resource waste.

The following further describes the voice call method provided by the embodiments of this application. The current voice call is, for example, a VoWiFi call, the first network is, for example, VoWiFi, the second network is, for example, VOLTE, and the electronic device is, for example, terminal UE.

To solve the above technical problems, the embodiments of this application provide a voice call method, which can be implemented as a VoWiFi call method based on network bandwidth allocation. In the solution, on the one hand, when multiple services are concurrent in a desirable Wi-Fi network environment (that is, the current network environment level is high and an environment status may be distinguished and determined based on a network speed), it can be ensured that a network resource is intelligently allocated to a networked application while VoWiFi call quality is not affected. On the other hand, when multiple services are concurrent in an ordinary Wi-Fi network environment (that is, the current network environment level is moderate), it can be ensured that a service preferentially selected by the user is normal. In addition, when multiple services are concurrent in a poor Wi-Fi network environment (that is, the current network environment level is low), the user is prompted to switch the VoWiFi call to a VOLTE network and provide the occupied Wi-Fi bandwidth resource to another network application, so as to ensure quality and continuity of the call and improve user experience.

Figure 2:
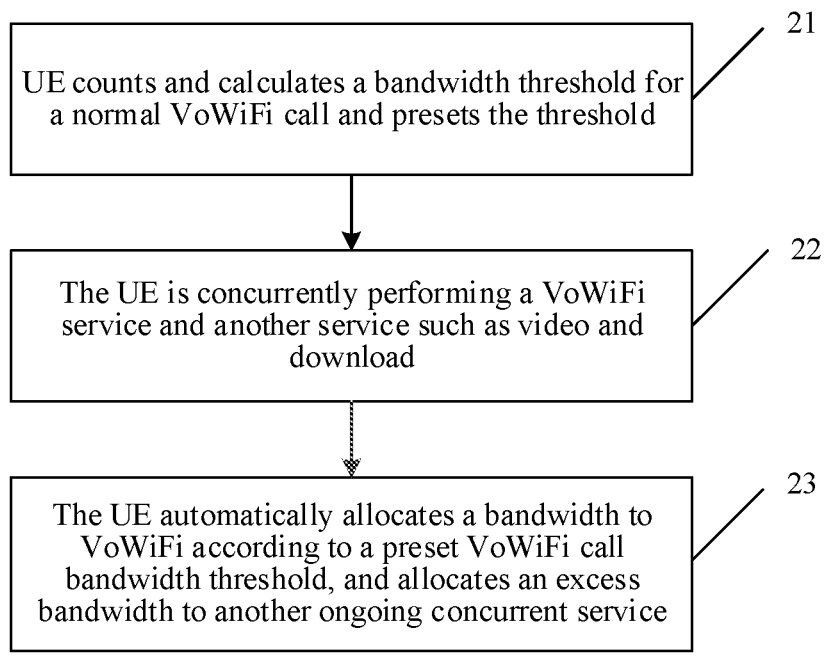
FIG. 2 is a schematic flowchart 1 of a specific application of a voice call method according to an embodiment of this application.

The solution provided by the embodiments of this application is described below by using examples:

Example 1: When multiple services are concurrent in a desirable Wi-Fi network environment, bandwidths are allocated to a VoWiFi service and another service. A process may be shown in FIG. 2 and includes:

Step 21: UE counts and calculates a bandwidth threshold for a normal VoWiFi call and presets the threshold.

Alternatively, the UE needs to count and calculate the bandwidth threshold for a normal VoWiFi call, and may determine the bandwidth threshold according to a packet loss rate of a VoWiFi call. When the packet loss rate is lower than a threshold w, a VoWiFi call is considered as being smooth and normal (that is, the call is normal), and in this case, a bandwidth threshold allocated to a VoWiFi service is recorded and stored in the UE.

Step 22: The UE is concurrently performing the VoWiFi service and another service such as video and download (that is, the UE is running the VoWiFi service and is also running another service such as video and download, and the VoWiFi service and the another service are concurrent).

Alternatively, in a desirable Wi-Fi network environment, the UE is concurrently performing the VoWiFi service and another service such as video and download.

Step 23: The UE automatically allocates a bandwidth to VoWiFi according to a preset VoWiFi call bandwidth threshold (that is, the bandwidth threshold obtained above), and allocates an excess bandwidth to another (current) ongoing concurrent service.

Alternatively, the UE automatically allocates a bandwidth to VoWiFi according to the preset VoWiFi call bandwidth threshold, and allocates the excess bandwidth to another ongoing concurrent service (that is, another ongoing concurrent service), such as video, background download, or WeChat. This not only ensures that the VoWiFi call is smooth and normal, but also avoids bandwidth resource waste and fully allocates bandwidth resources to other ongoing services such as video and download.

Figure 3:
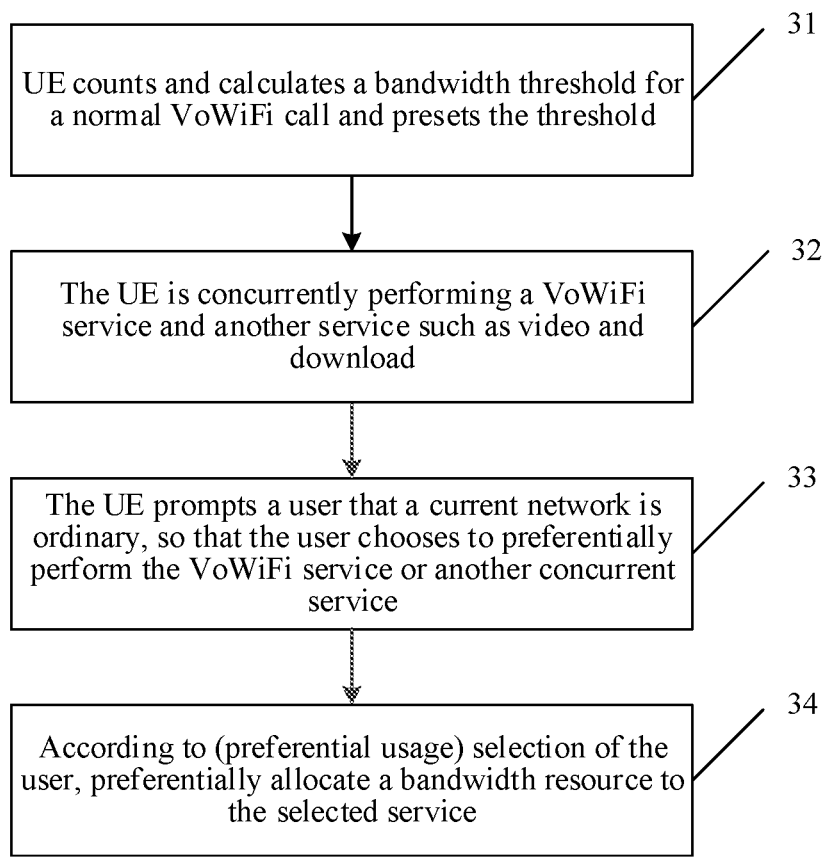
FIG. 3 is a schematic flowchart 2 of a specific application of a voice call method according to an embodiment of this application.

Example 2: When multiple services are concurrent in an ordinary Wi-Fi network environment, bandwidths are allocated to a VoWiFi service and another service. A process may be shown in FIG. 3 and includes:

Step 31: UE counts and calculates a bandwidth threshold for a normal VoWiFi call and presets the threshold.

Alternatively, the UE needs to count and calculate the bandwidth threshold for a normal VoWiFi call, and may determine the bandwidth threshold according to a packet loss rate of a VoWiFi call. When the packet loss rate is lower than a threshold w, a VoWiFi call is considered as being smooth and normal (that is, the call is normal), and in this case, a bandwidth threshold allocated to a VoWiFi service is recorded and stored in the UE.

Step 32: The UE is concurrently performing the VoWiFi service and another service such as video and download.

Alternatively, when the Wi-Fi network environment is ordinary, the UE is concurrently performing the VoWiFi service and another service such as video and download.

Step 33: The UE prompts a user that a current network is ordinary, so that the user chooses to preferentially perform the VoWiFi service or another (ongoing) concurrent service.

Alternatively, when the Wi-Fi network environment is ordinary, the UE pops up a prompt: the current network is ordinary and concurrent execution of VoWiFi and other services such as video and background download causes a call exception or a video exception. In addition, a prompt box may pop up for the user to choose to preferentially allocate a network bandwidth resource to a specific service, so as to ensure that the preferentially selected service is normal as much as possible.

Step 34: According to (preferential usage) selection of the user, preferentially allocate a bandwidth resource to the selected service.

Alternatively, a bandwidth resource is allocated according to the service preferentially selected by the user. If the user chooses to preferentially use the VoWiFi (call) service, the UE preferentially allocates a bandwidth to the VoWiFi service according to the network status and the VoWiFi preset bandwidth threshold (that is, the bandwidth threshold obtained above). In this case, if there is still an excess bandwidth resource, the excess bandwidth resource is allocated to another ongoing concurrent service. In this way, the user preferentially selects a service for bandwidth resource allocation, to ensure that the selected service is normal and improve user experience.

In the ordinary Wi-Fi network environment, the service priority for preferential bandwidth allocation may be determined according to real-time user selection, or may be preset, or may be determined by the UE independently according to user usage rule information (for example, if three of five pieces of usage record information indicate that a bandwidth allocation priority of the VoWiFi service is higher than that of a download service, it is determined that the bandwidth allocation priority of the VoWiFi service is higher than that of the download service). This is not limited herein.

Figure 4:
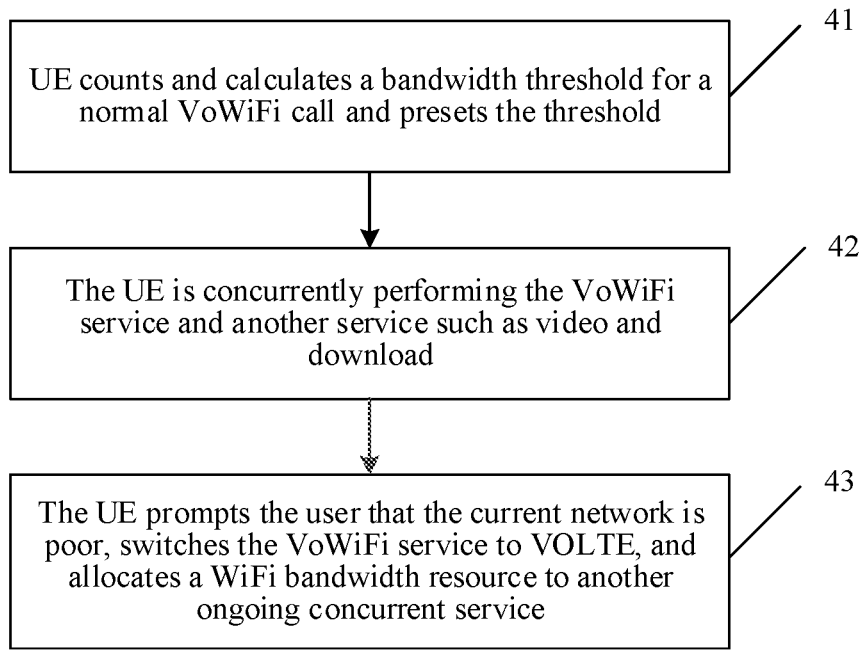
FIG. 4 is a schematic flowchart 3 of a specific application of a voice call method according to an embodiment of this application.

Example 3: When multiple services are concurrent in a poor Wi-Fi network environment, bandwidths are allocated to a VoWiFi service and another service. A process may be shown in FIG. 4 and includes:

Step 41: UE counts and calculates a bandwidth threshold for a normal VoWiFi call and presets the threshold.

Alternatively, the UE needs to count and calculate the bandwidth threshold for a normal VoWiFi call, and may determine the bandwidth threshold according to a packet loss rate of a VoWiFi call. When the packet loss rate is lower than a threshold w, a VoWiFi call is considered as being smooth and normal (that is, the call is normal), and a bandwidth threshold allocated to a VoWiFi service is recorded and stored in the UE.

Step 42: The UE is concurrently performing the VoWiFi service and another service such as video and download.

Alternatively, in a poor Wi-Fi network environment, the UE is concurrently performing the VoWiFi service and another service such as video and download.

Step 43: The UE prompts the user that the current network is poor, switches the VoWiFi service to VOLTE, and allocates a Wi-Fi bandwidth resource to another ongoing concurrent service.

Alternatively, the UE prompts the user that the current network is poor and attempts to switch the VoWiFi service to VOLTE for execution. If the UE successfully switches to VOLTE for a call, a (Wi-Fi) bandwidth resource occupied by the VoWiFi service before the switch is allocated to another ongoing concurrent service. This not only ensures continuity of the call, but also allocates a bandwidth resource to another ongoing service as much as possible, to ensure normal operation of another service as much as possible. If switching of the UE fails, the network environment may be detected at preset intervals, and the solution of example 1, example 2, or example 3 may be executed again according to the network environment, but this constitutes no limitation.

It can be seen from the above that the solution provided by the embodiments of this application has the following advantages:

First, when multiple services are concurrent in a desirable Wi-Fi network environment, it can be ensured that a network resource is intelligently allocated to a networked application while VoWiFi call quality is not affected. This can make full use of the network bandwidth resource and avoid the network bandwidth resource waste.

Second, when multiple services are concurrent in an ordinary Wi-Fi network environment, a prompt pops up for the user to select a preferential service, so as to ensure that the service preferentially selected by the user is normal, so that user experience is improved.

Third, when multiple services are concurrent in a poor Wi-Fi network environment, the user is prompted to switch the VoWiFi call to a VOLTE network and provide the occupied Wi-Fi bandwidth resource to another network application, to ensure quality and continuity of the call and improve user experience.

It should be noted that the voice call method provided by the embodiments of this application may be performed by a voice call apparatus or a control module included in the voice call apparatus and configured to execute the voice call method. In an embodiment of the application, the voice call apparatus provided in the embodiments of the application is described by using an example in which the voice call method is performed by a voice call apparatus.

Figure 5:
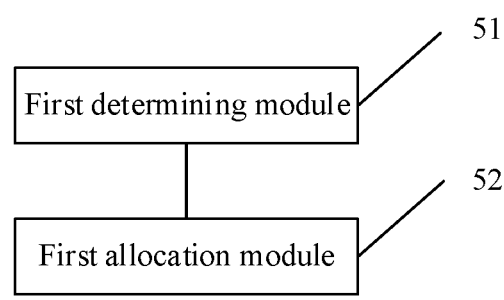
FIG. 5 is a schematic structural diagram of a voice call apparatus according to an embodiment of this application.

An embodiment of this application further provides a voice call apparatus, as shown in FIG. 5, including:

a first determining module 51 configured to determine current network environment level information of a first network of a current voice call according to current network parameter information of the first network; and a first allocation module 52 configured to allocate a bandwidth to the current voice call according to the current network environment level information;

where the current network parameter information includes current network speed information; and the bandwidth is a bandwidth of the first network or a bandwidth of a second network, and the first network is different from the second network.

In the voice call apparatus provided by the embodiments of this application, the current network environment level information of the first network of the current voice call is determined according to the current network parameter information of the first network; and the bandwidth is allocated to the current voice call according to the current network environment level information; where the current network parameter information includes current network speed information, the bandwidth is a bandwidth of the first network or a bandwidth of a second network, and the first network is different from the second network. Therefore, the voice call may be implemented based on network bandwidth allocation, so as to avoid that factors such as a network speed or network resource allocation reduce call quality in the voice call, ensure call quality and continuity, improve user experience, and desirably solve the problem of unstable call quality in the existing VoWiFi call solution.

Further, the voice call apparatus further includes: a second determining module configured to: before the bandwidth is allocated to the current voice call according to the current network environment level information, determine a bandwidth lower limit required for the current voice call in the first network, and using the bandwidth lower limit as a bandwidth threshold.

The second determining module includes: a first determining submodule configured to determine, according to a packet loss rate of the current voice call, the bandwidth lower limit required for the current voice call in the first network.

Alternatively, the first allocation module includes: a first allocation submodule configured to: in a case that the current network environment level information indicates that the current network environment level is high, allocate the bandwidth of the first network to the current voice call according to the bandwidth threshold.

Further, the voice call apparatus further includes: a second allocation module configured to: after the bandwidth is allocated to the current voice call according to the current network environment level information, allocate, to a current concurrent service of the current voice call, a remaining bandwidth of the bandwidth of the first network other than the bandwidth allocated to the current voice call.

The first allocation module includes: a second allocation submodule configured to: in a case that the current network environment level information indicates that the current network environment level is moderate, allocate the bandwidth of the first network to the current voice call and the current concurrent service of the current voice call according to a preset parameter, where the preset parameter includes: a priority order of the current voice call and the current concurrent service of the current voice call, or the preset parameter includes: the priority order and the bandwidth threshold.

Alternatively, the first allocation module includes: a third allocation submodule configured to: in a case that the current network environment level information indicates that the current network environment level is low, allocate the bandwidth of the second network to the current voice call.

It can be seen from the above that the solution provided by the embodiments of this application has the following advantages:

First, when multiple services are concurrent in a desirable Wi-Fi network environment, it can be ensured that a network resource is intelligently allocated to a networked application while VoWiFi call quality is not affected. This can make full use of the network bandwidth resource and avoid the network bandwidth resource waste.

Second, when multiple services are concurrent in an ordinary Wi-Fi network environment, a prompt pops up for the user to select a preferential service, so as to ensure that the service preferentially selected by the user is normal, so that user experience is improved.

Third, when multiple services are concurrent in a poor Wi-Fi network environment, the user is prompted to switch the VoWiFi call to a VOLTE network and provide the occupied Wi-Fi bandwidth resource to another network application, to ensure quality and continuity of the call and improve user experience.

The voice call apparatus in this embodiment of this application may be an apparatus, or a component, an integrated circuit, or a chip in a terminal. The apparatus may be a mobile electronic device or a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine, or a self-service machine. This is not specifically limited in the embodiments of this application.

The voice call apparatus in this embodiment of this application may be an apparatus with an operating system. The operating system may be an Android (Android) operating system, or may be an iOS operating system or other possible operating systems, which is not specifically limited in the embodiments of this application.

The voice call apparatus provided in this embodiment of the application may implement the processes implemented in the method embodiments of FIG. 1 to FIG. 4. To avoid repetition, details are not described herein again.

Figure 6:
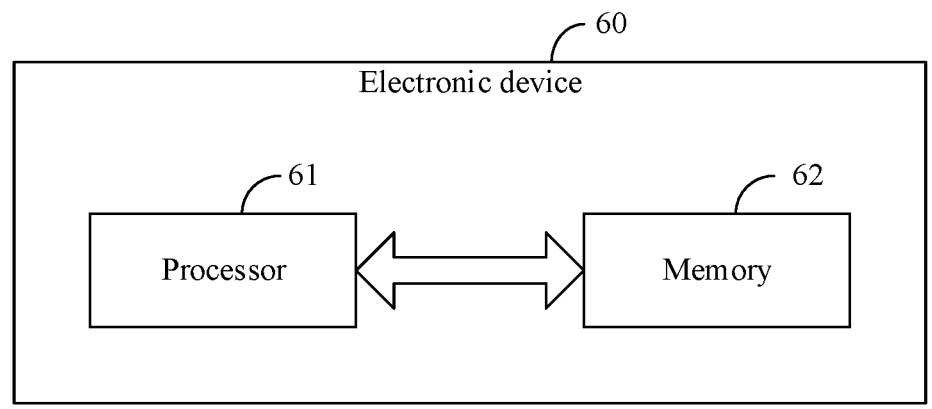
FIG. 6 is a schematic structural diagram 1 of an electronic device according to an embodiment of this application.

Optionally, as shown in FIG. 6, the embodiments of this application further provide an electronic device 60, including a processor 61, a memory 62, and programs or instructions stored in the memory 62 and executable on the processor 61. When the programs or instructions are executed by the processor 61, the processes of the foregoing embodiment of the voice call method are implemented, and a same technical effect can be achieved. To avoid repetition, details are not described herein again.

It should be noted that the electronic device in this embodiment of this application includes the above mobile electronic device and non-mobile electronic device.

Figure 7:
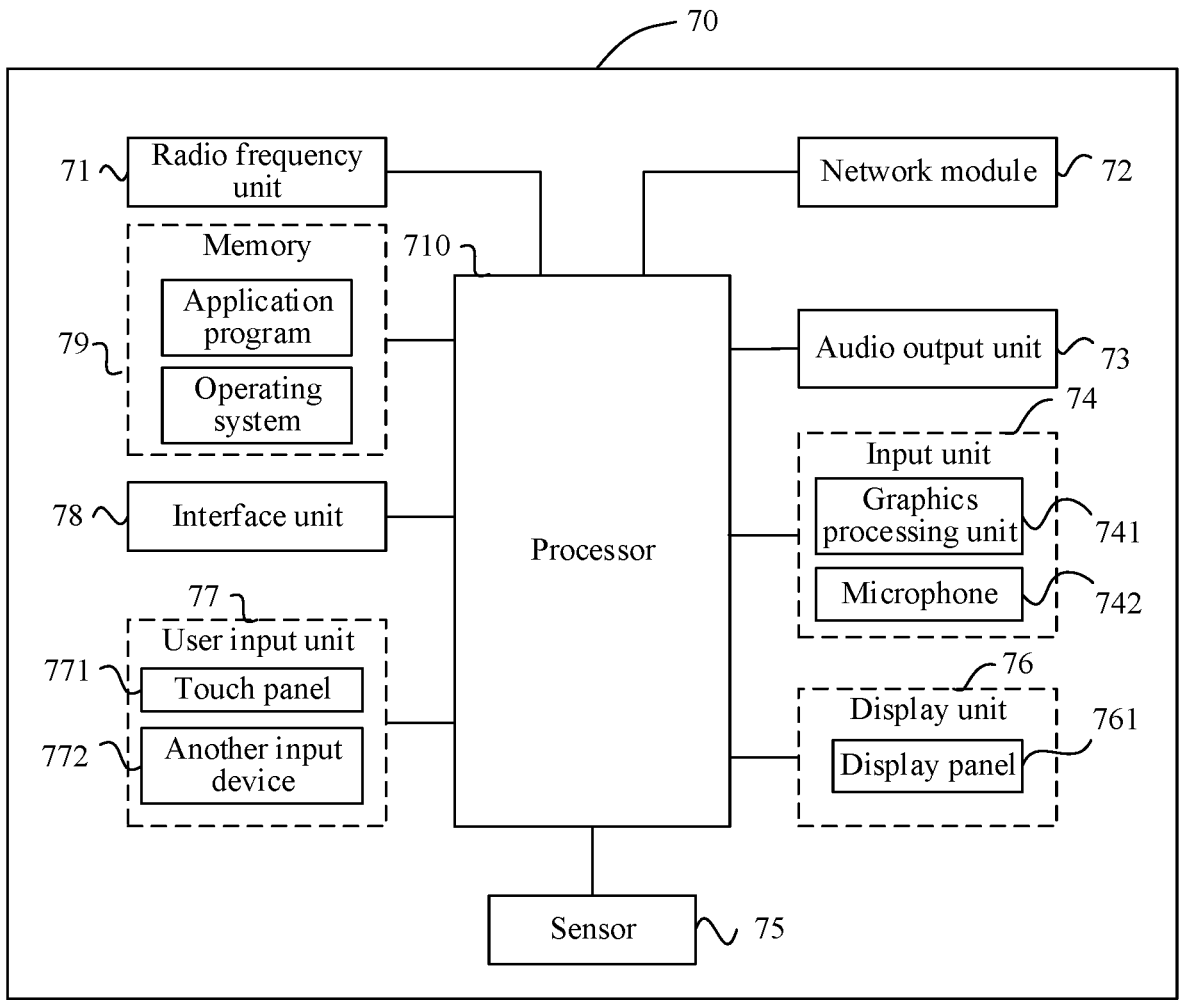
FIG. 7 is a schematic structural diagram 2 of an electronic device according to an embodiment of this application.

FIG. 7 is a schematic diagram of a hardware structure of an electronic device according to an embodiment of this application. The electronic device 70 includes, but is not limited to, components such as a radio frequency unit 71, a network module 72, an audio output unit 73, an input unit 74, a sensor 75, a display unit 76, a user input unit 77, an interface unit 78, a memory 79, and a processor 710.

Those skilled in the art can understand that the electronic device 70 may further include the power supply (such as a battery) supplying power to each component. The power supply may be logically connected to the processor 710 by using a power management system, so as to implement functions such as charging management, discharging management and power consumption management by using the power management system. The structure of the electronic device shown in FIG. 7 constitutes no limitation on the electronic device. The electronic device may include more or fewer components than those shown in the figure, or a combination of some components, or an arrangement of different components. Details are not described herein again.

The processor 710 is configured to determine the current network environment level information of the first network of the current voice call according to the current network parameter information of the first network; and allocate the bandwidth to the current voice call according to the current network environment level information; where the current network parameter information includes current network speed information, the bandwidth is a bandwidth of the first network or a bandwidth of a second network, and the first network is different from the second network.

In the embodiments of this application, the current network environment level information of the first network of the current voice call is determined according to the current network parameter information of the first network; and the bandwidth is allocated to the current voice call according to the current network environment level information; where the current network parameter information includes current network speed information, the bandwidth is a bandwidth of the first network or a bandwidth of a second network, and the first network is different from the second network. Therefore, the voice call may be implemented based on network bandwidth allocation, so as to avoid that factors such as a network speed or network resource allocation reduce call quality in the voice call, ensure call quality and continuity, improve user experience, and desirably solve the problem of unstable call quality in the existing VoWiFi call solution.

Optionally, the processor 710 is further configured to: before allocating the bandwidth to the current voice call according to the current network environment level information, determine a bandwidth lower limit required for the current voice call in the first network, and use the bandwidth lower limit as a bandwidth threshold.

Optionally, the processor 710 is configured to determine, according to a packet loss rate of the current voice call, the bandwidth lower limit required for the current voice call in the first network.

Optionally, the processor 710 is configured to: in a case that the current network environment level information indicates that the current network environment level is high, allocate the bandwidth of the first network to the current voice call according to the bandwidth threshold.

Optionally, the processor 710 is further configured to: after allocating the bandwidth to the current voice call according to the current network environment level information, allocate, to a current concurrent service of the current voice call, a remaining bandwidth of the bandwidth of the first network other than the bandwidth allocated to the current voice call.

Optionally, the processor 710 is configured to: in a case that the current network environment level information indicates that the current network environment level is moderate, allocate the bandwidth of the first network to the current voice call and the current concurrent service of the current voice call according to a preset parameter, where the preset parameter includes: a priority order of the current voice call and the current concurrent service of the current voice call, or the preset parameter includes: the priority order and the bandwidth threshold.

Optionally, the processor 710 is configured to: in a case that the current network environment level information indicates that the current network environment level is low, allocate the bandwidth of the second network to the current voice call.

It can be seen from the above that the solution provided by the embodiments of this application has the following advantages:

First, when multiple services are concurrent in a desirable Wi-Fi network environment, it can be ensured that a network resource is intelligently allocated to a networked application while VoWiFi call quality is not affected. This can make full use of the network bandwidth resource and avoid the network bandwidth resource waste.

Second, when multiple services are concurrent in an ordinary Wi-Fi network environment, a prompt pops up for the user to select a preferential service, so as to ensure that the service preferentially selected by the user is normal, so that user experience is improved.

Third, when multiple services are concurrent in a poor Wi-Fi network environment, the user is prompted to switch the VoWiFi call to a VOLTE network and provide the occupied Wi-Fi bandwidth resource to another network application, to ensure quality and continuity of the call and improve user experience.

It should be understood that in this embodiment of this application, the input unit 74 may include a graphics processing unit (GPU) 741 and a microphone 742, and the graphics processing unit 741 processes image data of a still picture or a video obtained by an image capture apparatus (such as a camera) in a video capture mode or an image capture mode. The display unit 76 may include a display panel 761, and the display panel 761 may be configured in the form of a liquid crystal display, an organic light-emitting diode, and the like. The user input unit 77 includes a touch panel 771 and another input device 772. The touch panel 771 is also called a touch screen. The touch panel 771 may include two parts: a touch detection apparatus and a touch controller. The another input device 772 may include but is not limited to: a physical keyboard, a function key (such as a volume control key or a switch key), a trackball, a mouse, and a joystick, which is no longer repeated herein. The memory 79 may be configured to store software programs and various data, including but not limited to application programs and operating systems. The processor 710 may integrate an application processor and a modem processor. The application processor mainly processes an operating system, a user interface, an application program, and the like. The modem processor mainly processes wireless communication. It may be understood that the modem processor may alternatively not be integrated into the processor 710.

The embodiments of this application further provide a readable storage medium, storing a program or an instruction, the program or the instruction, when executed by a processor, implementing processes of the foregoing voice call method embodiments. The same technical effects may be achieved. To avoid repetition, details are not described herein again.

The processor is a processor in the electronic device described in the foregoing embodiment. The readable storage medium includes a computer-readable storage medium such as a read-only memory (ROM), a random access memory (RAM), a magnetic disk, or an optical disc.

The embodiments of this application further provide a chip, including a processor and a communication interface, the communication interface being coupled to the processor, and the processor being configured to run a program or an instruction to implement processes of the foregoing voice call method embodiments. The same technical effects may be achieved. To avoid repetition, details are not described herein again.

It should be understood that, the chip mentioned in the embodiments of this application may also be referred to as a system-level chip, a system chip, a chip system, a system on chip, or the like.

It may be understood that the embodiments described in the present disclosure may be implemented by using hardware, software, firmware, middleware, microcode, or a combination thereof. For hardware implementation, a module, a unit, a sub module, a sub unit may be implemented in one or more application specific integrated circuits (ASIC), a digital signal processor (DSP), a digital signal processing device (DSPD), a programmable logic device (PLD), a field-programmable gate array (FPGA), a general purpose processor, a controller, a micro-controller, a microprocessor, and other electronic units configured to execute the functions described in this application, or a combination thereof.

It should be noted that the terms "include", "comprise", or any other variants thereof in this specification are intended to cover a non-exclusive inclusion, so that a process, method, object, or apparatus including a series of elements not only include those elements, but also include other elements which are not clearly listed, or include inherent elements of the process, method, object, or apparatus. Without more limitations, elements defined by the sentence "including one" does not exclude that there is still another same element in the process, method, object, or apparatus including the element. In addition, it should be pointed out that the scope of the methods and apparatuses in the implementations of this application is not limited to performing functions in an order shown or discussed, but may further include performing functions in a basically simultaneous manner or a converse order according to the involved functions. For example, the described methods may be performed in an order different from the described order, and various steps may be added, omitted, or combined. In addition, features described with reference to some examples may be combined in other examples.

Through the descriptions of the foregoing implementations, a person skilled in the art may clearly understand that the methods in the foregoing embodiments may be implemented by means of software and a necessary general hardware platform, and certainly, may also be implemented by hardware, but in many cases, the former manner is a better implementation. Based on such an understanding, the technical solutions of this application essentially or the part contributing to the prior art may be embodied in a form of a software product. The computer software product is stored in a storage medium (such as a ROM/RAM, a magnetic disk, or an optical disc) and includes several instructions to enable a terminal (which may be a mobile phone, a computer, a server, an air conditioner, a network device, or the like) to perform the methods described in the embodiments of this application.

The embodiments of this application are described above with reference to the accompanying drawings. However, this application is not limited to the foregoing specific implementations. The foregoing specific implementations are only exemplary and not limitative. Enlightened by this application, a person of ordinary skill in the art may further make many variations without departing from the idea of this application and the protection scope of the claims. All of the variations fall within the protection scope of this application.

What is claimed is:

1. A voice call method, comprising:
   determining current network environment level information of a first network of a current voice call according to current network parameter information of the first network; and
   allocating a bandwidth to the current voice call according to the current network environment level information;
   wherein the current network parameter information comprises current network speed information; and
   the bandwidth is a bandwidth of the first network or a bandwidth of a second network, and the first network is different from the second network;
   wherein before the allocating a bandwidth to the current voice call according to the current network environment level information, the method further comprises: determining a bandwidth lower limit required for the current voice call in the first network, and using the bandwidth lower limit as a bandwidth threshold;
   wherein the determining a bandwidth lower limit required for the current voice call in the first network comprises: determining, according to a packet loss rate of the current voice call, the bandwidth lower limit required for the current voice call in the first network.

2. The voice call method according to claim 1, wherein the allocating a bandwidth to the current voice call according to the current network environment level information comprises:
   in a case that the current network environment level information indicates that the current network environment level is high, allocating the bandwidth of the first network to the current voice call according to the bandwidth threshold.

3. The voice call method according to claim 2, wherein after the allocating a bandwidth to the current voice call according to the current network environment level information, the method further comprises:
   allocating, to a current concurrent service of the current voice call, a remaining bandwidth of the bandwidth of the first network other than the bandwidth allocated to the current voice call.

4. The voice call method according to claim 1, wherein the allocating a bandwidth to the current voice call according to the current network environment level information comprises:
   in a case that the current network environment level information indicates that the current network environment level is moderate, allocating the bandwidth of the first network to the current voice call and the current concurrent service of the current voice call according to a preset parameter,
   wherein the preset parameter comprises: a priority order of the current voice call and the current concurrent service of the current voice call, or the preset parameter comprises: the priority order and the bandwidth threshold.

5. The voice call method according to claim 1, wherein the allocating a bandwidth to the current voice call according to the current network environment level information comprises:
   in a case that the current network environment level information indicates that the current network environment level is low, allocating the bandwidth of the second network to the current voice call.

6. An electronic device, comprising:
   a processor; and
   a memory storing programs or instructions that is executable on the processor, wherein the programs or instructions, when executed by the processor, cause the electronic device to perform the following steps:
   determining current network environment level information of a first network of a current voice call according to current network parameter information of the first network; and
   allocating a bandwidth to the current voice call according to the current network environment level information;
   wherein the current network parameter information comprises current network speed information; and
   the bandwidth is a bandwidth of the first network or a bandwidth of a second network, and the first network is different from the second network;
   wherein before the allocating a bandwidth to the current voice call according to the current network environment level information, the programs or instructions, when executed by the processor, cause the electronic device to further perform the following steps: determining a bandwidth lower limit required for the current voice call in the first network, and using the bandwidth lower limit as a bandwidth threshold;
   wherein the determining a bandwidth lower limit required for the current voice call in the first network comprises: determining, according to a packet loss rate of the current voice call, the bandwidth lower limit required for the current voice call in the first network.

7. The electronic device according to claim 6, wherein the allocating a bandwidth to the current voice call according to the current network environment level information comprises:
   in a case that the current network environment level information indicates that the current network environment level is high, allocating the bandwidth of the first network to the current voice call according to the bandwidth threshold.

8. The electronic device according to claim 7, wherein after the allocating a bandwidth to the current voice call according to the current network environment level information, the programs or instructions, when executed by the processor, cause the electronic device to further perform the following steps:
   allocating, to a current concurrent service of the current voice call, a remaining bandwidth of the bandwidth of the first network other than the bandwidth allocated to the current voice call.

9. The electronic device according to claim 6, wherein the allocating a bandwidth to the current voice call according to the current network environment level information comprises:
   in a case that the current network environment level information indicates that the current network environment level is moderate, allocating the bandwidth of the first network to the current voice call and the current concurrent service of the current voice call according to a preset parameter,
   wherein the preset parameter comprises: a priority order of the current voice call and the current concurrent service of the current voice call, or the preset parameter comprises: the priority order and the bandwidth threshold.

10. The electronic device according to claim 6, wherein the allocating a bandwidth to the current voice call according to the current network environment level information comprises:
    in a case that the current network environment level information indicates that the current network environment level is low, allocating the bandwidth of the second network to the current voice call.

11. A non-transitory readable storage medium storing programs or instructions, wherein the programs or instructions, when executed by a processor, perform the following steps:
   determining current network environment level information of a first network of a current voice call according to current network parameter information of the first network; and
   allocating a bandwidth to the current voice call according to the current network environment level information;
   wherein the current network parameter information comprises current network speed information; and
   the bandwidth is a bandwidth of the first network or a bandwidth of a second network, and the first network is different from the second network;
   wherein before the allocating a bandwidth to the current voice call according to the current network environment level information, the programs or instructions, when executed by a processor, perform the following steps: determining a bandwidth lower limit required for the current voice call in the first network, and using the bandwidth lower limit as a bandwidth threshold;
   wherein the determining a bandwidth lower limit required for the current voice call in the first network comprises: determining, according to a packet loss rate of the current voice call, the bandwidth lower limit required for the current voice call in the first network.

12. The non-transitory readable storage medium according to claim 11, wherein the allocating a bandwidth to the current voice call according to the current network environment level information comprises:
   in a case that the current network environment level information indicates that the current network environment level is high, allocating the bandwidth of the first network to the current voice call according to the bandwidth threshold.

13. The non-transitory readable storage medium according to claim 12, wherein after the allocating a bandwidth to the current voice call according to the current network environment level information, the programs or instructions, when executed by a processor, perform the following steps:
   allocating, to a current concurrent service of the current voice call, a remaining bandwidth of the bandwidth of the first network other than the bandwidth allocated to the current voice call.

14. The non-transitory readable storage medium according to claim 11, wherein the allocating a bandwidth to the current voice call according to the current network environment level information comprises:
   in a case that the current network environment level information indicates that the current network environment level is moderate, allocating the bandwidth of the first network to the current voice call and the current concurrent service of the current voice call according to a preset parameter,
   wherein the preset parameter comprises: a priority order of the current voice call and the current concurrent service of the current voice call, or the preset parameter comprises: the priority order and the bandwidth threshold.

15. The non-transitory readable storage medium according to claim 11, wherein the allocating a bandwidth to the current voice call according to the current network environment level information comprises:
   in a case that the current network environment level information indicates that the current network environment level is low, allocating the bandwidth of the second network to the current voice call.

* * * * *